US009006949B2

(12) United States Patent
Kusase et al.

(10) Patent No.: US 9,006,949 B2
(45) Date of Patent: Apr. 14, 2015

(54) SYNCHRONOUS MOTOR

(71) Applicant: Denso Corporation, Kariya (JP)

(72) Inventors: Shin Kusase, Obu (JP); Keiji Kondou, Toyota (JP)

(73) Assignee: Denso Corporation, Kariya (JP)

( * ) Notice: Subject to any disclaimer, the term of this patent is extended or adjusted under 35 U.S.C. 154(b) by 211 days.

(21) Appl. No.: 13/741,697

(22) Filed: Jan. 15, 2013

(65) Prior Publication Data

US 2013/0207498 A1 Aug. 15, 2013

(30) Foreign Application Priority Data

Feb. 13, 2012 (JP) .................................. 2012-027910

(51) Int. Cl.
*H02K 7/20* (2006.01)
*H02K 1/27* (2006.01)
*H02K 16/00* (2006.01)
*H02K 1/16* (2006.01)
*H02K 16/04* (2006.01)
*H02K 21/12* (2006.01)

(52) U.S. Cl.
CPC ............. *H02K 1/2706* (2013.01); *H02K 16/00* (2013.01); *H02K 1/16* (2013.01); *H02K 16/04* (2013.01); *H02K 21/12* (2013.01); *H02K 1/27* (2013.01); *H02K 2213/03* (2013.01)

(58) Field of Classification Search
CPC ....... H02K 16/02; H02K 16/00; H02K 16/04; H02K 21/00
USPC ...................... 310/162, 112, 113, 156.35, 266
See application file for complete search history.

(56) References Cited

U.S. PATENT DOCUMENTS

| 5,744,895 | A | * | 4/1998 | Seguchi et al. | ................ 310/266 |
| 5,994,809 | A | * | 11/1999 | Ackermann | ................... 310/103 |
| 6,459,185 | B1 | * | 10/2002 | Ehrhart et al. | ............ 310/156.45 |
| 7,791,245 | B1 | * | 9/2010 | Hao et al. | ....................... 310/266 |
| 8,294,318 | B2 | * | 10/2012 | Bando et al. | ............. 310/156.01 |
| 2004/0108781 | A1 | * | 6/2004 | Razzell et al. | ................. 310/112 |
| 2006/0214526 | A1 | * | 9/2006 | Morita et al. | ................. 310/112 |
| 2008/0169720 | A1 | * | 7/2008 | Petek | ........................ 310/156.35 |
| 2011/0285238 | A1 | | 11/2011 | Kusase et al. | |

FOREIGN PATENT DOCUMENTS

JP        2011-244643        12/2011

* cited by examiner

*Primary Examiner* — Thanh Lam
(74) *Attorney, Agent, or Firm* — Nixon & Vanderhye P.C.

(57) ABSTRACT

A double-stator synchronous motor has a rotor, an inner stator and an outer stator. The rotor has segment-magnetic poles arranged in a ring shape. Magnetic poles formed in the inner stator and the outer stator face to each other in a same circumferential position. Each stator has q ($q \geq 2$) slots per pole and phase to disperse magnetomodive force. A radially minimum width Wr of each segment magnetic pole is within a range of 1.3q to 2.3q times of a minimum width Wt of outer teeth. A magnetic depth of a magnetic concave section formed in the segment magnetic pole is within a range of not less than an average width Ws of the inner slots. Because this suppresses demagnetization in the permanent magnets caused by stator magnetomotive force, ferrite magnets are used as buried magnets and magnetic-pole central magnets, and suppress the amount of neodymium magnet used in the rotor.

8 Claims, 10 Drawing Sheets

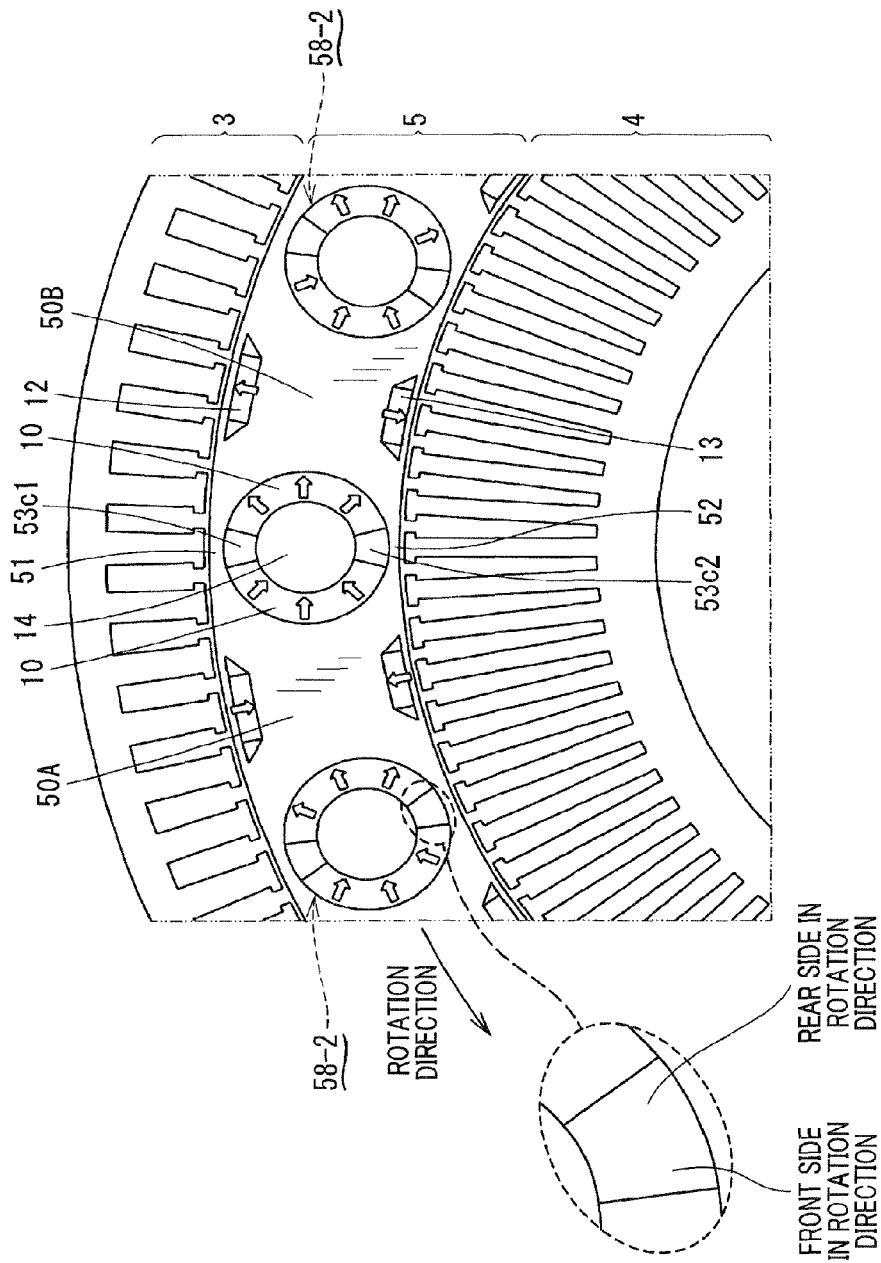

SYNCHRONOUS MOTOR

CROSS-REFERENCE TO RELATED APPLICATION

This application is related to and claims priority from Japanese Patent Application No. 2012-027910 filed on Feb. 13, 2012, the contents of which are hereby incorporated by reference.

BACKGROUND OF THE INVENTION

1. Field of the Invention

The present invention relates to synchronous motors to be used for various industrial devices and hybrid electric vehicles, etc., and more particularly, relates to double stator synchronous motors having a double stator structure and which consume a less amount of rare earth magnets or no rare earth magnet by using ferrite magnets instead of rare earth magnets.

2. Description of the Related Art

There are known double stator electric motors having a double stator structure composed of an outer stator, an inner stator and a rotor. In a conventional double stator electric motor, the outer stator is disposed on a radially outer side of the stator and the inner stator is disposed on a radially inner side of the rotor.

For example, a conventional patent document, Japanese laid open publication No. 2001-244643 discloses an electric motor having a rotor, an inner stator and an outer stator.

In the rotor, a plurality of segment magnetic poles is arranged in a circumferential direction of the rotor at regular intervals apart from each other. The segment magnetic poles are made of soft magnetic material. A neodymium magnet is arranged between the adjacent segment magnetic poles.

The stator has the outer stator and the inner stator. Each of the outer stator and the inner stator has magnetic poles, whose number is the same number of the segment magnetic poles in the rotor. The outer stator and the inner stator have the same magnetomotive forces, and are disposed in face-to-face relationship to each other through the segment magnetic poles of the rotor.

Because the conventional electric motor disclosed in the conventional patent document has a small magnetic resistance of a magnetic circuit and decreases an amount of magnetic flux leakage, it is possible to relax the saturation of the iron core and decrease an iron core loss, and this makes it possible to improve the efficiency of the motor at high speed rotation.

In addition, because a reluctance torque is generated when magnetic flux passes in a circumferential direction of the rotor through the segment magnetic poles, and it is thereby possible for the electric motor to generate a large output torque without using any strong magnet. This makes it possible to promote a size reduction of the electric motor and to save the consumption of rare earth magnets.

By the way, there is a strong demand for electric motors such as surface permanent magnet synchronous motors (IP-MSM) to more decrease the consumption of such rare earth magnets and to use ferrite magnets instead of the use of rare earth magnets due to the depletion of rare earth resources and the increased cost of rare earth resources. It is therefore desired to progress in technical development of the electric motor field.

However, the electric motor as the conventional technique disclosed in the conventional patent document has a decreased output torque when using ferrite magnets instead of using neodymium magnets arranged between adjacent segment magnetic poles because such ferrite magnets have a low magnetic flux density which is smaller than a magnetic flux density of neodymium magnets.

In addition, because such ferrite magnets have a low magnetic field at a critical point in a demagnetization curve, demagnetization easily occurs in an electric motor having windings of a large magnetomotive force such as a drive motor used for electric motor vehicles. That is, because ferrite magnets have a low residual magnetic flux density and low coercive force, it is difficult in principle for such ferrite magnets to generate a large output torque in a limited space of an electric motor, as compared with the output torque when using neodymium magnets.

A first subject in the conventional techniques to be solved is to find a method of having a large magnet area when ferrite magnets are used instead of neodymium magnets.

A second subject in the conventional techniques to be solved is to find a method of using ferrite magnets having a low critical point in a demagnetization curve without causing demagnetization.

A third subject in the conventional technique to be solved is to find a method of effectively using a reduced amount of neodymium magnets.

SUMMARY

It is therefore desired to provide a synchronous motor, more particularly, to provide a double stator synchronous motor such as a surface permanent magnet synchronous motor (IPMSM) using buried magnets made of rare earth magnets, to be used for motor vehicles such as hybrid electric vehicles, capable of generating a high output torque without using any rare earth magnets or with a reduced amount of rare earth magnets.

An exemplary embodiment provides a synchronous motor having a rotor and a stator assembly. The rotor has segment magnetic poles made of soft magnetic material arranged in a ring shape in a circumferential direction of the rotor. A magnetic concave section having a magnetic permeability is lower than a magnetic permeability of the soft magnetic material. The magnetic concave section is formed on each of an inner surface and an outer surface of each of the segment magnetic poles. The stator assembly has at least a first stator and a second stator. The first stator is arranged at an outside of the rotor through a gap. The first stator has a plurality of slots and a first teeth section. The first teeth section has a plurality of first tooth sections formed in the first stator at regular intervals. Each first tooth section is formed between the adjacent slots. A first stator winding is wound around the first tooth sections. The second stator is arranged at an inside of the rotor through a gap. The second stator has a plurality of slots and a second teeth section. The second teeth section has a plurality of second tooth sections formed in a circumferential direction of the second stator at regular intervals. Each second tooth section is formed between the adjacent slots. A second stator winding is wound around the second tooth sections. Each of the first stator and the second stator has the same number of magnetic poles which is the same number as the segment magnetic poles. The first stator and the second stator generate magnetomotive force so that the magnetic poles in the first stator and the second stator in face-to face relationship in a direction have the same magnetic polarity. The first stator winding and the second stator winding per phase are connected in series with each other. A variable q representing the number of the slots per magnetic pole per phase is an integer not less than two. A minimum width Wr of the segment magnetic poles is within a range of 1.3q to 2.3q times of a minimum width Wt of the first tooth sections in the first stator. The minimum width Wr is a width in a direction between the magnetic concave section formed at an outer side of the segment magnetic pole and the magnetic concave section formed at an inner side of the segment magnetic pole. A depth of the magnetic concave section is not less than an average width Ws of the slots formed in the second stator.

It is possible for the subject matter according to the present invention to have the following structure in which the first stator is an outer stator and the second stator is an inner stator. That is, a synchronous motor has the rotor and the stator assembly.

The stator assembly has at least the outer stator and the inner stator. The outer stator is arranged at a radial outside of the rotor through a gap. The outer stator has a plurality of the slots and an outer teeth section. The outer teeth section has a plurality of outer tooth sections formed in a circumferential direction of the outer stator at regular intervals. Each outer tooth section is formed between the circumferentially adjacent slots 30. An outer stator winding 33 is wound around the outer tooth sections 31. The inner stator is arranged at a radially inside of the rotor through a gap. The inner stator has a plurality of the slots and an inner teeth section. The inner teeth section has a plurality of inner tooth sections formed in a circumferential direction of the inner stator at regular intervals. Each inner tooth section is formed between the circumferentially adjacent slots. An inner stator winding is wound around the inner tooth sections. Each of the outer stator and the inner stator has the same number of magnetic poles which is the same number as the segment magnetic poles. The outer stator and the inner stator generate magnetomotive force so that the magnetic poles in the outer stator and the inner stator in face-to face relationship in a radial direction have the same magnetic polarity. The outer stator winding and the inner stator winding per phase are connected in series with each other. The variable q representing the number of the slots per magnetic pole per phase is an integer not less than two. A radially minimum width Wr of the segment magnetic poles is within a range of 1.3q to 2.3q times of a minimum width Wt of the tooth sections in the outer stator. The radially minimum width Wr is a width in a radial direction between the magnetic concave section formed at a radially outer side of the segment magnetic pole and the magnetic concave section formed at a radially inner side of the segment magnetic pole. A radial depth of the magnetic concave section is not less than an average width Ws of the slots formed in the inner stator.

Because a distribution of magnetomotive force generated in the outer stator and magnetomotive force generated in the inner stator is dispersed in the double stator synchronous motor having the above structure, it is possible to decrease the concentration of magnetic flux between the rotor and each tooth section in the teeth section of the outer stator and the inner stator. As a result, because magnetomotive force loss in an aperture section is decreased and on the other hand a q-axis magnetic flux as a reluctance torque is increased, it is possible to increase an output torque of the double stator synchronous motor.

It is necessary to make a passage through which the q-axis magnetic flux passes to the segment magnetic poles, that is, to optimally keep the radially minimum width of the segment magnet poles, but not necessary to have a radially large width. Because the segment magnet poles have the radially minimum optimal width, the outer diameter of the inner stator is increased when the radial width becomes wide. This decreases the output torque. Further, the depth of the magnetic concave section formed in the segment magnetic pole is small. Therefore a difference in magnetic potential between the segment magnetic poles becomes large by the reverse magnetic field to be supplied to the overall of the segment magnet poles, the amount of leakage of magnetic flux is increased.

It is therefore necessary to effectively form the magnetic concave section in the segment magnet pole in order to obstruct as much as possible the magnetic field generated in the outer stator and the magnetic field generated in the inner stator. In the structure of the double stator synchronous motor according to the present invention, the radial depth of the magnetic concave section (or a depth in a radial direction of the magnetic concave section) formed in the segment magnetic pole is not less than the average width of the slots formed in the inner stator, and the radially minimum width of the segment magnetic pole (or the minimum depth in a radial direction of the segment magnet pole) is within a range of 1.3q to 2.3q times of the minimum width of the teeth formed in the outer stator.

This structure makes it possible to obstruct the magnetic field, similar to the case in which the magnetic field is obstructed by the teeth around which the outer stator winding is wound and the inner stator winding is wound, where the outer stator winding and the inner stator winding are power sources to provide magnetomotive force in order to generate a magnetic field.

According to the present invention, the structure of the double stator synchronous motor having the structure previously described and which will be explained later in detail, can pass necessary magnetic flux and obstruct unnecessary magnetic field, and generate high output torque.

BRIEF DESCRIPTION OF THE DRAWINGS

A preferred, non-limiting embodiment of the present invention will be described by way of example with reference to the accompanying drawings, in which:

FIG. 10 is a view showing a partial cross section of a double stator synchronous motor according to a sixth exemplary embodiment of the present invention.

DETAILED DESCRIPTION OF THE PREFERRED EMBODIMENTS

Figure 1:
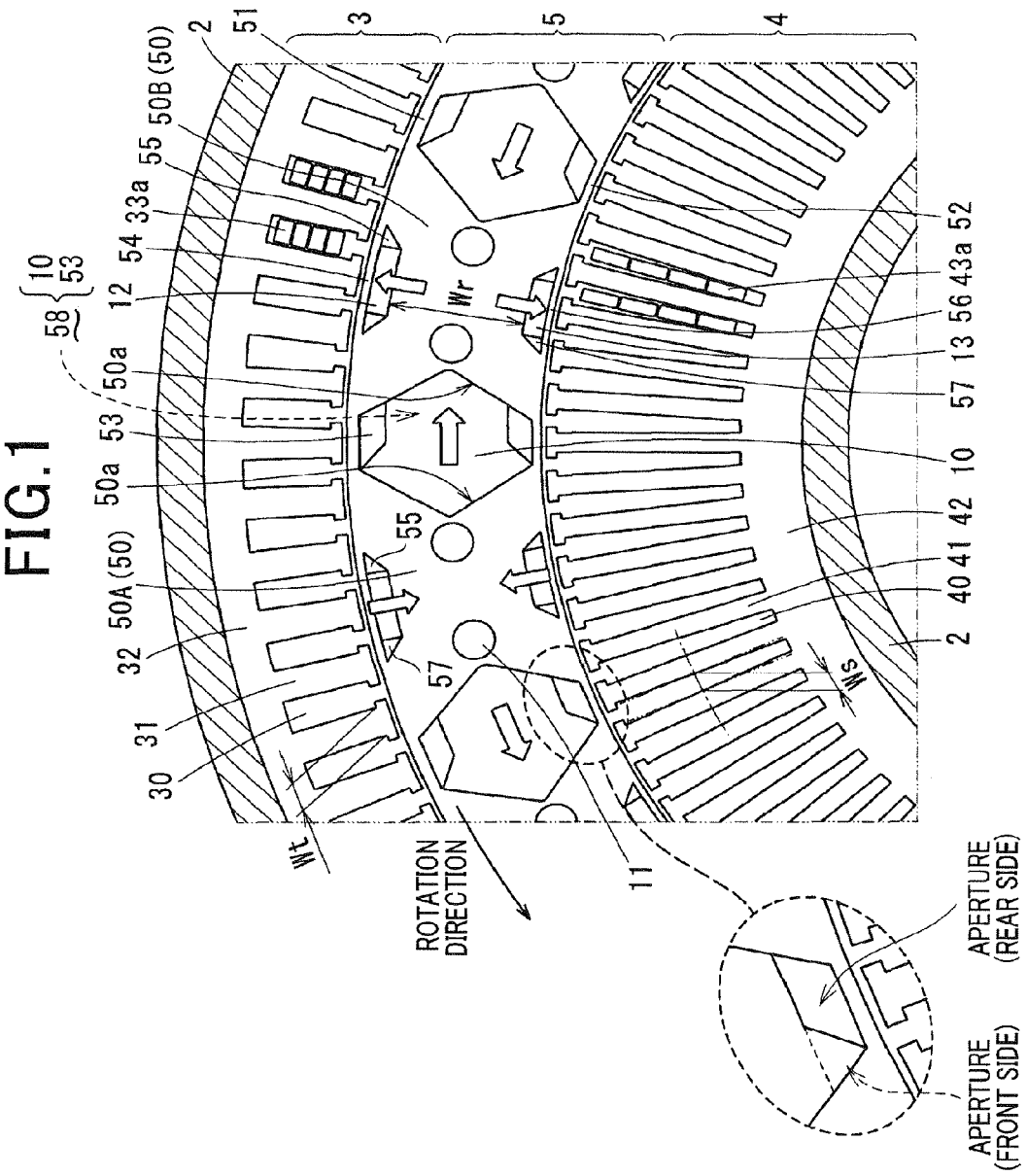
FIG. 1 is a view showing a partial cross section of a double stator synchronous motor according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

At first, the concept of the present invention relates to a synchronous motor, for example, a double stator synchronous motor. Such a double stator synchronous motor has a rotor and a stator assembly composed of a first stator and a second stator. In a structure of one stator assembly, the first stator and the second stator are arranged at both sides in an axial direction of the rotor. In a structure of the other stator assembly, the first stator is arranged at a radially outside section of the rotor, and the second stator is arranged at a radially inner section of the rotor. The following explanation of the first exemplary embodiment will explain the latter case of the stator assembly in which an outer stator as the first stator is arranged at a radially outside section of the rotor, and an inner stator as the second stator is arranged at a radially inner section of the rotor.

A description will be given of a double stator synchronous motor 1 according to the first exemplary embodiment of the present invention with reference to FIG. 1 to FIG. 5.

The first exemplary embodiment of the present invention uses the double stator synchronous motor 1 according to the first exemplary embodiment as a drive motor which is directly connected to an engine crank shaft in a hybrid electric vehicle.

A description will now be given of the structure of the double stator synchronous motor 1.

Figure 2:
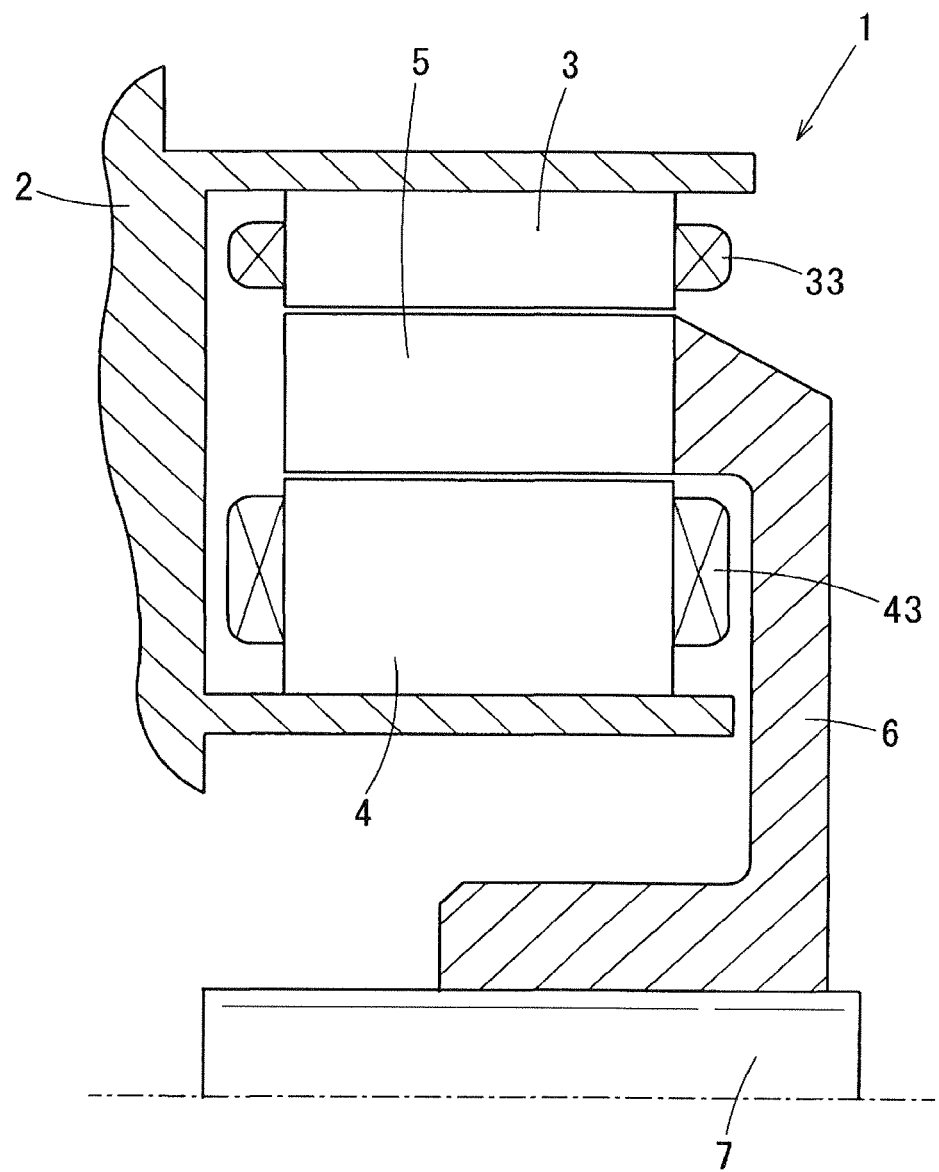
FIG. 2 is a view showing a vertical cross section of the double stator synchronous motor according to the first exemplary embodiment of the present invention.

FIG. 1 is a view showing a partial cross section of a double stator synchronous motor 1 according to the first exemplary embodiment. FIG. 2 is a view showing a vertical cross section of the double stator synchronous motor 1 according to the first exemplary embodiment.

As shown in FIG. 2, the double stator synchronous motor 1 according to the first exemplary embodiment has a housing case 2, an outer stator 3, an inner stator 4, a rotor 5, a rotor disk 6 and a motor rotary shaft 7. The outer circumferential section of the outer stator 3 is fixed to the housing case 2. The inner circumferential section of the inner stator 4 is fixed to the housing case 2. The rotor 5 is rotatably disposed with a gap between the outer stator 3 and the inner stator 4 so that the rotor 5 faces the outer stator 3 and the inner stator 4. The rotor 5 is directly connected to the motor rotary shaft 7 through the rotor disk 6.

As shown in FIG. 1, the outer stator 3 has a plurality of outer slots 30, an outer stator iron core 32 and an outer stator winding 33 (see FIG. 2). In the first exemplary embodiment, the number of the outer slots 30 is 96. The outer slots 30 are arranged at regular intervals along a circumferential direction of the outer stator 3. The outer stator core 32 has an outer teeth section. The outer teeth section has a plurality of outer tooth sections 31. Each outer tooth section 31 is formed in a circumferential direction between the adjacent outer slots 30. The outer stator winding 33 is wound around the outer tooth sections 31 through the outer slot 30.

The outer stator iron core 32 is composed of a plurality of magnetic steel plates having a ring shape laminated in a radial direction of the outer stator 3. The outer slots 30 are formed at the inner circumferential section side of the magnetic steel plates in a radial direction by a punching process. The outer stator iron core 32 has an outer diameter of 265 mm, an inner diameter of 221.4 mm, and a laminate thickness of 50 mm. The outer teeth section having the outer tooth sections 31 has a minimum width Wt of 3.8 mm.

Figure 3:
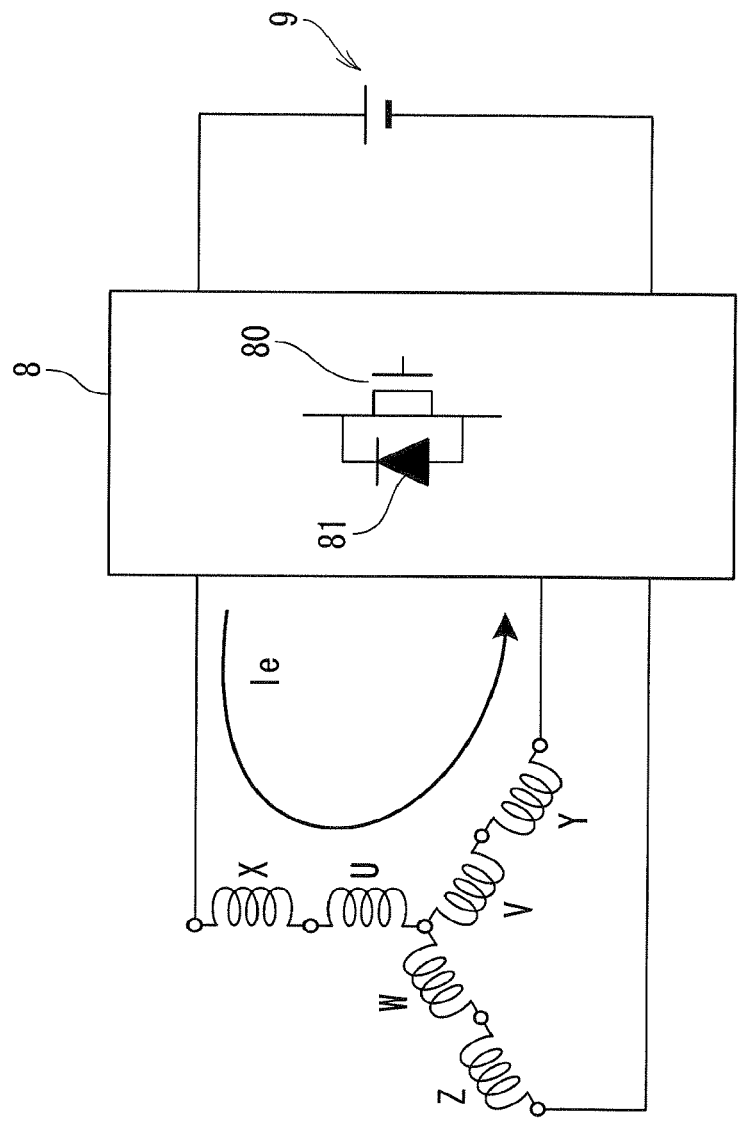
FIG. 3 is a schematic view showing a wire connection in phases between an outer stator winding (X phase, Y phase and Z phase) and an inner stator winding (U phase, V phase and W phase), and showing a current supply to the outer stator winding and the inner stator winding in the double stator synchronous motor according to the first exemplary embodiment of the present invention.

FIG. 3 is a schematic view showing a wire connection in phases between the outer stator winding 33 (X phase, Y phase and Z phase) and an inner stator winding 43 (U phase, V phase and W phase, which will be explained later). FIG. 3 further shows a current supply to the outer stator winding 33 and the inner stator winding 43 in the double stator synchronous motor 1 according to the first exemplary embodiment of the present invention.

As shown in FIG. 3, the outer stator winding 33 is configured with a star-connecting three phase coils (X phase coil, Y phase coil and Z phase coil). The phase of the star-connecting three phases is deviated from each other by 120°. The outer stator winding 33 configured with the three-phase coils is wound about the outer stator iron core 32 in a distributed manner where the number q2 of the outer slots 30 is 2 (q=2) and, and the number of the magnetic poles is 16 per magnetic pole in each phase. As shown in FIG. 1, rectangular conductors 33a having a rectangular cross section are used as each phase coil in the outer stator winding 33. The four rectangular conductors 33a are accommodated in each outer slot 30.

As shown in FIG. 1, the inner stator 4 has a plurality of inner slots 40, an inner stator iron core 42 and an inner stator winding 43 (see FIG. 2). In the first exemplary embodiment, the number of the inner slots 40 is 96. The inner slots 40 are arranged at regular intervals along a circumferential direction of the inner stator 4. The inner stator core 42 has an inner teeth section. The inner teeth section has a plurality of inner tooth sections 41. Each inner tooth section is formed between the adjacent inner slots 40 in a circumferential direction. The inner stator winding 43 is wound around the inner teeth section having the inner tooth sections 41 through the inner slot 40.

The inner stator iron core 42 is composed of a plurality of magnetic steel plates having a ring shape laminated in a radial direction of the inner stator 4. The inner slots 40 are formed at the outer circumferential section side of the magnetic steel plates in a radial direction by a punching process. The inner stator iron core 42 has an outer diameter of 173 mm, an inner diameter of 112.6 mm, and a laminate thickness of 50 mm. The inner slots 40 have an average width Ws of 2.5 mm.

As shown in FIG. 3, the inner stator winding 43 is configured by a star connecting three phase coils (U phase coil, V phase coil and W phase coil). The phase of the star connecting three phases is deviated from each other by 120°. The inner stator winding 43 configured by the three-phase coils is wound about the inner stator iron core 42 in a distributed manner where the number "q" of the inner slots 40 is 2 (q=2) per magnetic pole in each phase, and the number of magnetic poles is 16.

As shown in FIG. 1, rectangular conductors 43a have a cross section of a rectangular shape and are used as each phase coil in the inner stator winding 43. The four rectangular conductors 43a are accommodated in each inner slot 40.

As shown in FIG. 3, the outer stator winding 33 and the inner stator winding 43 are wound around the outer stator iron core 32 and the inner stator iron core 42, respectively so that:

(1) the phase coils in the outer stator winding 33 and the phase coils in inner stator winding 43 are connected in series, respectively;

(2) the magnitude of magnetomotive forces generated in the outer stator winding 33 and the magnitude of magnetomotive forces generated in the inner stator winding 43 are competed to each other when a phase current Ie flows in the outer stator winding 33 and the inner stator winding 43; and (3) The outer stator 3 and the inner stator 4 have the same magnetic pole faced to each other at the same position in a circumferential direction of the outer stator 3 and the inner stator 4.

The end sections in each of the three phases connected in series of the inner stator winding 33 and the inner stator winding 43 are electrically connected to a battery 9 which serves as a direct current (DC) power source through an inverter 8.

The inverter 8 is a known electric power conversion device through which a DC power is converted to an alternating current (AC) power. The inverter 8 is composed of a plurality of transistors 80, and a plurality of diodes 81. Each of the transistors 80 and the corresponding diode 81 are connected to each other in anti-parallel connection.

The inverter 8 is connected to a rotation position detection sensor of the rotor 5 (not shown) and an electric control unit (ECU, not shown). The rotation position detection sensor of the rotor 5 detects a rotation position of the rotor 5. The ECU controls the operation of the transistors in the inverter 8 on the basis of the detection information transmitted from the rotation position detection sensor of the rotor 5.

The inverter 8 converts the DC power in the battery 9 to the AC power and supplies the AC power to the outer stator winding 33 and the inner stator winding 43 on the basis of the detected rotation position of the rotor 5.

The rotor 5 has a rotor iron core and a plurality of permanent magnets 10. Each permanent magnet will be referred to as the "buried magnet". The rotor iron core has a plurality of segment magnetic poles 50. The segment magnetic poles 50 are arranged along a circumferential direction of the rotor 5 to have a ring shape. In the structure of the double stator synchronous motor 1, the number of the segment magnetic poles 50 is sixteen.

As shown in FIG. 1, each of the buried magnets 10 is disposed between the adjacent segment magnetic poles 50. A magnetic concave section (or a magnetic depressed section) is formed on each of an inner surface and an outer surface of the segment magnetic poles 50.

The rotor iron corer is made of a plurality of magnetic steel plates. The magnetic steel plates have a ring shape and are stacked. The magnet steel plates are punched to make a ring shape, namely, the shape of each segment magnetic pole 50. The rotor iron core in the rotor 5 has an outer diameter of 220.2 mm, an inner diameter of 174.2 mm, and a laminate thickness of 50 mm.

In the rotor iron core, the segment magnetic poles 50 are stacked in a laminate direction and fixed to each other by fastening pins (see FIG. 1) made of soft magnetic material. The segment magnetic poles 50 forming the rotor iron core are also fixed to the rotor disk 6 (see FIG. 2). The segment magnetic poles 50 are arranged at regular intervals along a circumferential direction of the rotor 5. The adjacent segment magnetic poles 50 in a circumferential direction of the rotor 5 are connected to each other in a ring shape through a magnetic-pole outside bridge 51 and a magnetic-pole inside bridge 52.

In the adjacent segment magnetic poles 50 arranged in a circumferential direction of the rotor 5, one segment magnetic pole 50A (as a first segment magnetic pole 50A) is the left side segment magnetic pole 50 shown in FIG. 1. The other segment magnetic pole 50B (as a second segment magnetic pole 50B) is the right side segment magnetic pole 50 shown in FIG. 1. One segment magnetic pole 50A faces the other segment magnetic pole 50B in a circumferential direction through magnetic-pole facing surfaces 50a.

Through the magnetic-pole outside bridge 51, the radially-outermost peripheral surface of one segment magnetic pole 50A is connected in a circumferential direction of the rotor 5 to the radially-outermost diameter peripheral surface of the other segment magnetic pole 50B.

The magnetic-pole outside bridge 51 has a bridge thickness of 1.5 mm. A circumferential length of the outside bridge 51 has about one slot pitch of the outer stator 3.

Through the magnetic-pole inside bridge 52, the radially-innermost peripheral surface of one segment magnetic pole 50A is connected in a circumferential direction of the rotor 5 to the radially-innermost diameter peripheral surface of the other segment magnetic pole 50B.

The magnetic-pole inside bridge 52 has a bridge thickness of 1.0 mm. A circumferential length of the inside bridge 52 has about one slot pitch of the inner stator 4.

A magnetic-pole opening section 58 (see FIG. 1 and FIG. 8) is formed between the magnetic-pole facing surfaces 50a of one segment magnetic pole 50A and the magnetic-pole facing surfaces 50a of the other segment magnetic pole 50B, and between the magnetic-pole outside bridge 51 and the magnetic-pole inside bridge 52.

The magnetic-pole opening section 58 has a polygonal shape. As shown in FIG. 1, the opening width of the magnetic-pole opening section 58 is gradually increased from the edge section of the magnetic-pole opening section 58 in a radial direction toward the middle section of the magnetic-pole opening section 58. In other words, in each of the magnetic-pole facing surface 50a of one segment magnetic pole 50A and the magnetic-pole facing surface 50a of the other segment magnetic pole 50B, toward the middle section from both the edge sections of the magnetic-pole opening section 58, which are connected to the magnetic-pole outside bridge 51 and the magnetic-pole inside bridge 52, respectively, a circumferential length of the segment magnetic pole 50 is gradually shortened to have a tapered shape.

The width of the magnetic-pole opening section 58 in a circumferential direction, that is, a circumferential length between the magnetic-pole facing surface 50a of the one segment magnetic pole 50A and the magnetic-pole facing surface 50a of the other segment magnetic pole 50B is a circumferential length of the magnetic-pole outside bridge 51 at the radially outermost edge (the length of about one slot pitch of the outer stator 3), and is a circumferential length of the magnetic-pole outside bridge 51 at the radially innermost edge (the length of about one slot pitch of the inner stator 4).

In addition, the radially middle section of the magnetic-pole opening section 58, at which the maximum opening width, has a length of about three slot pitches of each of the outer stator 3 and the inner stator 4. In the structure of the double stator synchronous motor according to the first exemplary embodiment, the radially middle section of the magnetic-pole opening section 58 has a length of 19.3 mm.

The maximum opening width of the magnetic-pole opening section 58 in a radial direction of the rotor 5, namely, the radial length in a radial direction between the magnetic-pole outside bridge 51 and the magnetic-pole inside bridge 52 is 20.5 mm.

As previously described, each of the buried magnets 10 is disposed between the adjacent segment magnetic poles 50. That is, each buried magnet 10 is disposed in the magnetic-pole opening section 58 formed between one segment magnetic pole 50A and the other segment magnetic pole 50B which are adjacent to each other. The each buried magnet 10 is magnetized in a circumferential direction designated by the arrow mark shown in FIG. 1.

One buried magnet 10 and the other buried magnet 10, which are adjacent to each other in a circumferential direction of the rotor 5 and between which the segment magnetic pole 50 is disposed, are magnetized in a circumferentially opposite direction to have a different magnetic polarity in a circumferential direction.

Any movement of the buried magnet 10 is limited in a circumferential direction and in a radial direction of the rotor 5 by the magnetic-pole facing surface 50a of one segment magnetic pole 50A and the magnetic-pole facing surface 50a of the other segment magnetic pole 50B, which are adjacent to each other through the buried magnet 10.

That is, both surfaces of the buried magnet 10 in a circumferential direction have a tapered section which corresponds to a tapered section of the magnetic-pole facing surface 50a of one segment magnetic pole 50A and a tapered section of the magnetic-pole facing surface 50a of the other segment magnetic pole 50B. The tapered section of the buried magnet 10 is in contact with the tapered section of the magnetic-pole facing surface 50a of the segment magnetic pole 50. This prevents the movement of the magnetic-pole facing surface 50a of one segment magnetic pole 50A in the magnetic-pole opening section 58. A movement limiting section used in the claim 2 (which will be described later) according to the present invention is comprised of the tapered section of the buried magnet 10 and the tapered section of the magnetic-pole facing surface 50a of the segment magnetic pole 50.

The buried magnet 10 is formed so that the width in a radial direction of the buried magnet 10 which is in contact with the magnetic-pole facing surface 50a of one segment magnetic pole 50A is smaller than the width in a radial direction of the buried magnet 10 which is in contact with the magnetic-pole facing surface 50a of the other segment magnetic pole 50B. The buried magnet 10 has an arrow shape. That is, an aperture section 53 is formed at a rotational rear side in a rotation direction (in a counterclockwise direction) of the rotor 5 between the buried magnet 10 and the magnetic-pole outside bridge 51, and an aperture section 53 is also formed at a rotational rear side in a rotation direction of the rotor 5 between the buried magnet 10 and the magnetic-pole inside bridge 52.

The buried magnet 10 has a maximum thickness of 19.3 mm in a magnetized direction (or a circumferential direction), a minimum width of 14.5 mm in a rotational rear side, and a length (or depth) of 50 mm in an axial direction. Accordingly, the radial length of the aperture am section 53 becomes 3 mm, which is formed between the outside bridge 51 and the inside bridge 52.

An outer magnetic concave section is formed in a circumferential direction on a central section of the outer surface of the segment magnetic poles 50. An inner magnetic concave section is formed in a circumferential direction on a central section of the inner surface of the segment magnetic poles 50.

The outer magnetic concave section is composed of an outer flux barrier formed in the segment magnetic pole 50 and the permanent magnet (hereinafter, referred to as the "magnetic-pole central magnet 12") which is inserted in the outer magnetic concave section. The outer flux barrier is formed closed to the radially outermost section of the segment magnetic pole 50. The outer radial section of the outer flux barrier is closed by a magnetic-pole outside bridge 54. The magnetic-pole outside bridge 54 is positioned at the upper outside, observed from the center of the segment magnetic poles 50, as shown in FIG. 1. That is, the outer magnetic concave section is formed as a slit shaped space whose periphery is closed.

The outer flux barrier has an opening size of 3.5 mm in a radial direction, a maximum opening width of 14.3 mm in a circumferential direction, and a minimum opening width of 8.8 mm in a circumferential direction. Both sides of the outer flux barrier are slanted in the circumferential direction.

The magnetic-pole central magnet 12 is inserted in the outer flux barrier and magnetized in a direction designated by an upper-side white outline arrow in a radial direction shown in FIG. 1.

One magnetic-pole central magnet 12 and the other magnetic-pole central magnet 12 which are adjacent to each other in a circumferential direction are magnetized in a different polarity so that the magnetic poles at the radially inner side have a different magnetic polarity, and the magnetic poles at the radially outer side have a different magnetic polarity.

As designated by the upper-side white outline arrows shown in FIG. 1, one magnetic-pole central magnet 12 and the other magnetic-pole central magnet 12 which are adjacent to each other in a circumferential direction at the upper side of the segment magnetic poles 50 are magnetized in a different magnetic polarity so that the magnetic poles at the radially inner side have a different magnetic polarity, and the magnetic poles at the radially outer side have a different magnetic polarity.

The magnetic-pole central magnet 12 has a length in a magnetized direction, namely, a thickness of 3.5 mm in a radial direction, which is the same length of the opening section of the outer flux barrier, an opening width of 8.8 mm in a circumferential direction, which is the same width of the minimum opening width of the outer flux barrier, and a length (or a depth) of 50 mm in an axial direction.

An aperture section 55 having a triangle shape is formed at both outsides in a circumferential direction of the magnetic-pole central magnet 12 inserted in the outer flux barrier. The aperture section 55 has a maximum length of 2.75 mm in a circumferential direction.

The magnetic-pole outside bridge 54 has a bridge thickness of 1.0 mm in a radial direction. The magnetic-pole outside bridge 54 connects the outermost radial surfaces of the adjacent segment magnetic poles 50 formed at the both sides in a circumferential direction of the outer flux barrier.

The magnetic-pole outside bridge 54 is in contact with the magnetic-pole central magnet 12 inserted in the outer flux barrier, and the magnetic-pole outside bridge 54 is magnetically saturated. Because of this, it is possible for the magnetic-pole outside bridge 54 to have the same magnetic potential as the magnetic-pole central magnet 12 and to have the same magnetic permeability as air.

The outer magnetic concave section has a depth of 4.5 mm in a radial direction because the magnetic-pole outside bridge 54 has a bridge thickness of 1.0 mm and the magnetic-pole central magnet 12 has a thickness of 3.5 mm in a radial direction inserted in the outer flux barrier (4.5 mm=1.0 mm+3.5 mm).

The inner magnetic concave section is composed of an inner flux barrier formed in the segment magnetic pole 50 and a permanent magnet (hereinafter, referred to as the "magnetic-pole central magnet 13") which is inserted in the inner magnetic concave section. The inner flux barrier is formed closed to the radially innermost section of the segment magnetic pole 50. The inner radial section of the inner flux barrier is closed by a magnetic-pole inside bridge 56. The magnetic-pole inside bridge 56 is positioned at the lower outside of the segment magnetic poles 50, as shown in FIG. 1. That is, the inner magnetic concave section is formed as a slit shaped space whose periphery is closed.

The inner flux barrier has an opening size of 3.5 mm in a radial direction, a maximum opening width of 11.5 mm in a circumferential direction, and a minimum opening width of 7.4 mm in a circumferential direction. Both sides of the inner flux barrier is slanted with a circumferential direction.

The magnetic-pole central magnet 13 is inserted in the inner flux barrier and magnetized in a direction designated by a white outline arrow (in a radial direction) at a lower side shown in FIG. 1.

As designated by the lower-side white outline arrows shown in FIG. 1, one magnetic-pole central magnet 13 and the other magnetic-pole central magnet 13 which are adjacent to each other in a circumferential direction at the lower side of the segment magnetic poles 50 are magnetized in a different polarity. Further, the magnetic-pole central magnet 13 at the outside and the magnetic-pole central magnet 12 at the inside in a radial direction of the segment magnetic poles 50 are magnetized in the same magnetic polarity.

The magnetic-pole central magnet 13 has a length in a magnetized direction, namely, a thickness of 3.5 mm in a radial direction, which is the same length of the opening section of the inner flux barrier, an opening width of 7.4 mm in a circumferential direction, which is the same width of the minimum opening width of the inner flux barrier, and a length (or a depth) of 50 mm in an axial direction.

An aperture section 57 having a triangle shape is formed at both outsides in a circumferential direction of the magnetic-pole central magnet 13 inserted in the outer flux barrier. The aperture section 57 has a maximum length of 2.05 mm in a circumferential direction.

The magnetic-pole inside bridge 56 has a bridge thickness of 0.8 mm in a radial direction. The magnetic-pole inside bridge 56 connects the innermost radial surfaces of the adjacent segment magnetic poles 50 formed at the both sides in a circumferential direction of the inner flux barrier.

The magnetic-pole inside bridge 56 is in contact with the magnetic-pole central magnet 13 inserted in the inner flux barrier, and the magnetic-pole inside bridge 56 is magnetically saturated. Because of this, it is possible for the magnetic-pole inside bridge 56 to have the same magnetic potential of the magnetic-pole central magnet 13 and to have the same magnetic permeability of air.

The inner magnetic concave section has a depth of 4.3 mm in a radial direction because the magnetic-pole inside bridge 56 has a bridge thickness of 0.8 mm and the magnetic-pole central magnet 13 has a thickness of 3.5 mm in a radial direction inserted in the inner flux barrier (4.3 mm=0.8 mm+3.5 mm).

Each of the buried magnet 10, the magnetic-pole central magnet 12 and the magnetic-pole central magnet 13 is made of ferrite magnet, FB12H (manufactured by TDK Corporation).

As previously described, the outer flux barrier and the inner flux barrier are formed in the central section in a circumferential direction of the segment magnetic poles 50. The minimum width Wr (Wr=14.2 mm in the first exemplary embodiment shown in FIG. 1) in a radial direction is a length in a radial direction between the outer flux barrier and the inner flux barrier. The minimum length Wr is approximately 3.7 times of the minimum width Wt (Wt=3.8 mm) of the outer tooth section 31. The minimum length Wr is 1.8q times of the number of slots q (q=2) per magnetic pole per phase.

The depth of 4.5 mm in a radial direction of the outer magnetic concave section has approximately 1.8 times of the average width Ws=2.5 mm of the inner slots 40 formed in the inner stator iron core 42.

The depth of 4.3 mm in a radial direction of the inner magnetic concave section has approximately 1.7 times of the average width Ws=2.5 mm of the inner slots 40 formed in the inner stator iron core 42.

A description will now be given of the current flow into the outer stator winding 33 and the inner stator winding 43 with reference to FIG. 4.

Figure 4:
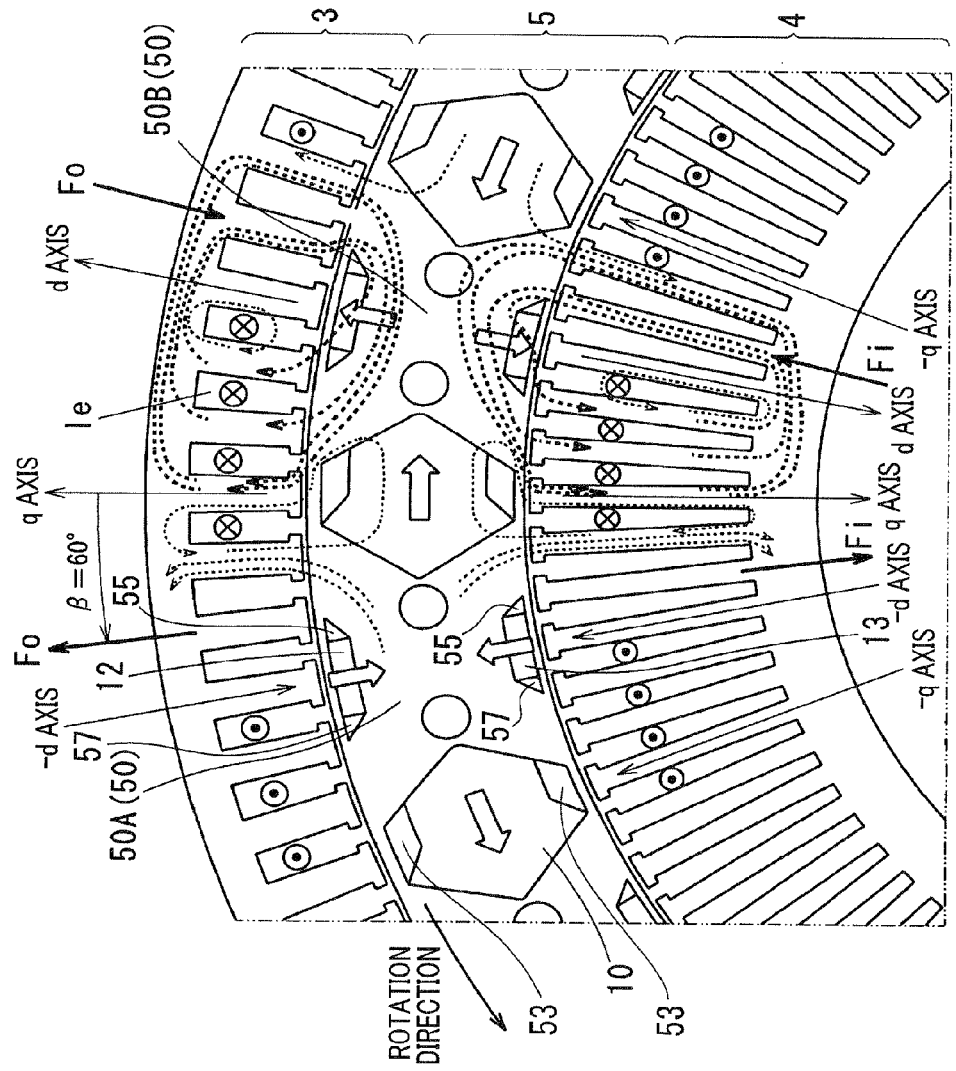
FIG. 4 is a view showing a relationship between a current flow and generated magnetic fluxes in the outer stator winding and the inner stator winding of the double stator synchronous motor according to the first exemplary embodiment of the present invention.

FIG. 4 is a view showing a relationship between a current flow and generated magnet fluxes in the outer stator winding 33 and the inner stator winding 43 in the double stator synchronous motor 1 according to the first exemplary embodiment of the present invention.

In FIG. 4, a d axis is a vertical axis which runs through a circumferential center of the segment magnetic pole 50. A q axis is a lateral axis which runs through between the adjacent segment magnetic poles 50 which are adjacent to each other in a circumferential direction of the rotor 5. The q axis is separated from the d axis by an electrical angle of 90° in a rotation direction of the rotor 5.

At the position separated from the q axis in the rotation direction of the rotor 5 by a phase of β°, an outer magnetomotive force vector Fo and an inner magnetomotive force vector Fi are generated, and a AC current is supplied to the outer stator winding 33 and the inner stator winding 43 so that the outer magnetomotive force vector Fo and the inner magnetomotive force vector Fi rotate in synchronization with the rotation of the rotor 5 in the rotation direction of the rotor 5. The outer stator winding 33 and the current make the outer magnetomotive force vector Fo. The inner stator winding 43 and the current make the inner magnetomotive force vector Fi.

The outer stator winding 33 and the inner stator winding 43, the rotation position detection sensor of the rotor 5, the control ECU and the inverter 8 have a structure to optimally change the phase angle β.

A description will now be given of the action of the double stator synchronous motor 1 according to the first exemplary embodiment of the present invention with reference to FIG. 5.

The usual action of the double stator synchronous motor 1 will be explained when the double stator synchronous motor 1 generates the maximum output torque.

Figure 5:
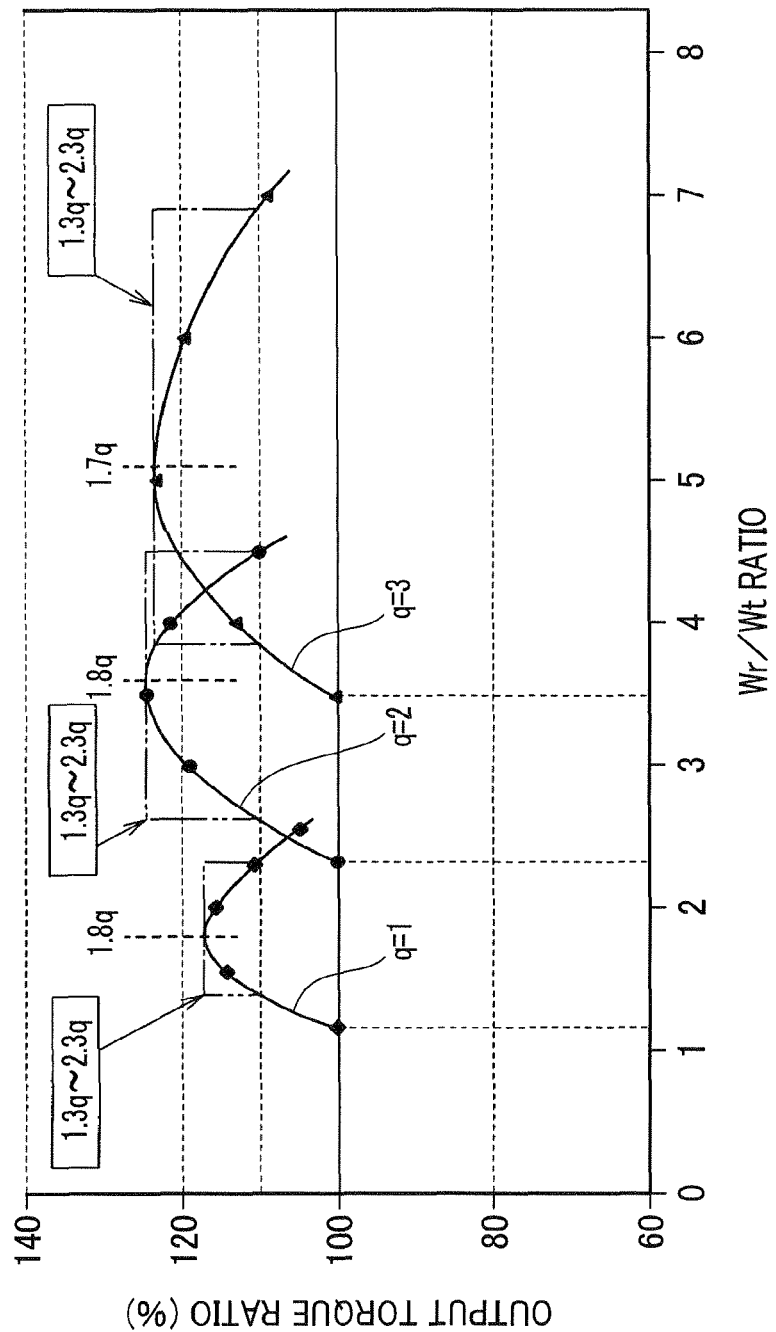
FIG. 5 is a view showing a relationship between an output torque ratio (%) and a Wr/Wt ratio of the double stator synchronous motor according to the first exemplary embodiment of the present invention.

FIG. 5 is a view showing a relationship between an output torque ratio (%) and a Wr/Wt ratio of the double stator synchronous motor 1 according to the first exemplary embodiment of the present invention.

When the phase angle β is 60° (β=60°), a sine wave phase current having an effective current value of 170 Amperes (170A) is supplied to the outer stator winding 33 and the inner stator winding 43 in order to generate a rotary magnetic field in synchronization with the rotation of the rotor 5. FIG. 4 shows a positional relationship between the rotor 5, the current flowing in each of the outer stator winding 33, the inner stator winding 43 and a flow of magnetic flux obtained on the basis of the results of magnetic field analysis. That is, in a macroscopic view, the magnetic flux generated by the magnets and the magnetic flux generated by the current flowing in the outer stator winding 33 and the inner stator winding 43 generate a rotary torque to rotate the rotor 5 in a rotation direction by a phase difference between the magnetic flux in the rotor 5 and the magnetic flux in the outer stator 3 and the inner stator 4 which are slanted to each other.

Under the condition of the phase difference and magnetic fluxes which are slanted to each other, as previously described, the flow of the magnetic flux and the concentration of the magnetic flux are obtained at a front side in a rotation direction of the segment magnetic pole 50, namely, a rear side in a rotation of the buried magnet 10, a reversely magnet field of magnetomotive force of the stator is significantly supplied to a rear side in a rotational direction of the buried magnet 10 and the magnetic-pole central magnet 12 and the magnetic-pole central magnet 13, and the reversely magnet field of magnetomotive force, namely, a magnetic potential is affected by the magnetic resistance in a circumferential direction in an area having the minimum width Wr in a radial direction of the segment magnetic pole 50.

That is, in the buried magnet 10 arranged between the adjacent segment magnetic poles 50 and the magnetic-pole central magnet 12 and the magnetic-pole central magnet 13, there is an area to easily decrease the magnet force of the magnetic-pole central magnet 12 and the magnetic-pole central magnet 13 in a rear side in the rotation of the rotor 5 at the area in which the magnetic force of each of the magnetic-pole outside bridge 51, the magnetic-pole inside bridge 52, the magnetic-pole outside bridge 54 and the magnetic-pole inside bridge 56.

However, as previously described, because the magnetomotive force is dispersed when the outer stator winding 33 and the inner stator winding 43 has a condition of q=2, and the magnetic concave section is formed on the inner surface and the outer surface of each segment magnetic pole 50, a stator reverse magnetic field to be supplied to the segment magnetic pole 50 is decreased, and it is thereby difficult to reduce the magnetization of the buried magnet 10 and the magnetic-pole central magnet 12 and the magnetic-pole central magnet 13. In addition to this, because the aperture section 53 is formed between the buried magnet 10 and the magnetic-pole outside bridge 51 and the magnetic-pole inside bridge 52 which are magnetized by induction field of the stator magnetic field, the aperture section 55 is formed between the magnetic-pole outside bridge 54 and the magnetic-pole central magnet 12, and the aperture section 57 is further formed between the magnetic-pole inside bridge 56 and the magnetic-pole central magnet 13, and the minimum width Wr in a radial direction of the segment magnetic pole 50 is optimally large, namely, the magnetic resistance is optimally decreased. Accordingly, although the buried magnet 10, the magnetic-pole central magnet 12 and the magnetic-pole central magnet 13 are made of ferrite magnet, it is possible that the buried magnet 10, the magnetic-pole central magnet 12 and the magnetic-pole central magnet 13 are set within a reduced magnet field of an allowable irreversible demagnetization field of not more than 350 kA/m, and correctly operate and work without demagnetization.

As previously described, the more the minimum width Wr in a radial direction of the segment magnetic pole 50 is increased, the more the magnetic resistance thereof is decreased, and it is difficult for the magnetic-pole central magnet 12 and the magnetic-pole central magnet 13 to be affected by the demagnetization field of the outer stator 3 and the inner stator 4. However, because the outer diameter of the inner stator 4 is decreased when the minimum width Wr in a radial direction of the segment magnetic pole 50 is increased, there is a possibility of decreasing the driving force as the output torque.

In order to determine an optimum value q and because the outer diameter, a supplied current, a current density in the outer stator winding 33 of the outer stator 3 are limited by various conditions such as the condition to mount the double stator synchronous motor 1 to a device such as a motor vehicle, the cooling condition and the control conditions, the outer diameter, the inner diameter and the laminated thickness of the outer stator 3 are fixed, and the number of the slots per magnetic pole per phase is changed in a simulation. That is, the inner diameter of the rotor 5, and the outer diameter of the inner stator 4. The q value of the outer stator 3 and the q value of the inner stator 4 are changed to have the same value.

On the basis of the minimum width Wt of the outer teeth section composed of the outer tooth sections 31, when the minimum width Wr in a radial direction of the segment magnetic pole 50 is changed, the relationship shown in FIG. 5 is obtained.

In the relationship shown in FIG. 5, the output torque of the double stator synchronous motor has 100% as a reference value when the Wr/Wt ratio of the double stator synchronous motor is 1.16q (Wr/Wt=1.16q).

It can be clearly understood from the relationship shown in FIG. 5, it is possible for the double stator synchronous motor to generate the maximum output torque only when the Wr/Wt ratio is 1.8q (Wr/Wt=1.8q) under the various conditions (q=1, 2, 3, . . . ), and to have the improved effect, namely, to have the output torque of not less than 110% of the reference value when the Wr/Wt ratio is within a range of 1.3q to 2.3q.

The double stator synchronous motor 1 according to the first exemplary embodiment is configured to have the maximum output torque on the basis of the relationship shown in FIG. 5. Accordingly, it is possible for the double stator synchronous motor 1 according to the first exemplary embodiment to avoid the demagnetization even if the buried magnet 10, the magnetic-pole central magnet 12 and the magnetic-pole central magnet 13 are made of ferrite magnet. It is possible for the double stator synchronous motor 1 according to the first exemplary embodiment to have the output torque of approximately not less than 1.2 times of the output torque generated by a conventional electric motor having the same shape and size in which the buried magnet 10 is made of ferrite magnet.

The conventional motor has the condition q=2, the Wr/Wt ratio is about 1q times, which are out of the range of 1.3q to 2.3q determined by the present invention previously described.

The double stator synchronous motor 1 according to the first exemplary embodiment, in which the buried magnet 10, the magnetic-pole central magnet 12 and the magnetic-pole central magnet 13 in the rotor 5 are made of ferrite magnet, is a drive motor used for hybrid electric vehicles. That is, the double stator synchronous motor 1 according to the first exemplary embodiment has a body size obtained by combining a body size of a surface permanent magnet synchronous motor (IPMSM) and a body size of the outer stator 3. By the way, the IPMSM has a structure in which rare earth neodymium magnets are embedded in the rotor core.

A description will now be given of the difference between the double stator synchronous motor 1 according to the first exemplary embodiment and an IPMSM by using FEA (JMAG, ver. 10.0, produced by JSOL Corporation). JMAG is simulation software for electromechanical design and development. JMAG can accurately capture and quickly evaluate complex physical phenomena inside of machines. The IPMSM has the following structure.

The stator has an outer diameter of 265 mm, an inner diameter of 195.2 mm, an iron core laminated thickness of 50 mm, and 16 magnetic poles. The rotor has an outer diameter of 194 mm, and a structure in which two buried neodymium magnets are arranged in V shape per magnetic pole. The number of the buried neodymium magnets is 32, an overall weight thereof is 680 grams, the maximum depth of the buried neodymium magnets is 12 mm, and the two buried neodymium magnets are arranged by 122°. The buried neodymium magnets are made of N36Z (as rare earth magnets manufactured by Shin-Etsu Chemical Co., Ltd.)

The conditions to detect a difference between the double stator synchronous motor 1 according to the first exemplary embodiment and the IPMSM by using FEA are as follows:

Temperature is 60° C.; a current to be supplied is a sine wave current having an effective value of 170 A; a current density flowing in a winding is 25 A/mm$^2$, and the maximum voltage is 500 V.

The difference in characteristics between the double stator synchronous motor 1 according to the first exemplary embodiment and the IPMSM by using FEA is as follows.

The double stator synchronous motor 1 according to the first exemplary embodiment generates:

an output torque of 291 Nm at low speed of 1000 rpm; and
an output torque of 128.1 Nm at high speed of 5000 rpm.

On the other hand, the IPMSM by using FEA generates:

an output torque of 290.9 Nm at low speed of 1000 rpm; and
an output torque of 128.0 Nm at high speed of 5000 rpm.

As described above, both the double stator synchronous motor 1 according to the first exemplary embodiment and the IPMSM by using FEA have approximately the same output torque.

At this time, the maximum demagnetization magnetic field of ferrite magnet is less than 300 kA/m which is within the allowable irreversible demagnetization field of 350 kA/m. This means that the double stator synchronous motor 1 according to the first exemplary embodiment can be used without demagnetization.

Further, the double stator synchronous motor 1 according to the first exemplary embodiment uses 1080 total grams of ferrite magnets. Although 1080 total grams of ferrite magnets exceeds the total use of 680 grams of ferrite magnets in the IPMSM by using FEA, the ferrite magnets are effectively fitted into the rotor 5 in the double stator synchronous motor 1 according to the first exemplary embodiment. Further, the double stator synchronous motor 1 according to the first exemplary embodiment has the magnets whose total costs is approximately 1/10 times of that of rare earth neodymium magnets. Still further, the commercial markets can provide stable shipment of ferrite magnets rather than rare earth neodymium magnets. Accordingly, the double stator synchronous motor 1 according to the first exemplary embodiment has the improved and significant effects.

Second Exemplary Embodiment

A description will be given of the double stator synchronous motor according to a second exemplary embodiment with reference to FIG. 6.

Figure 6:
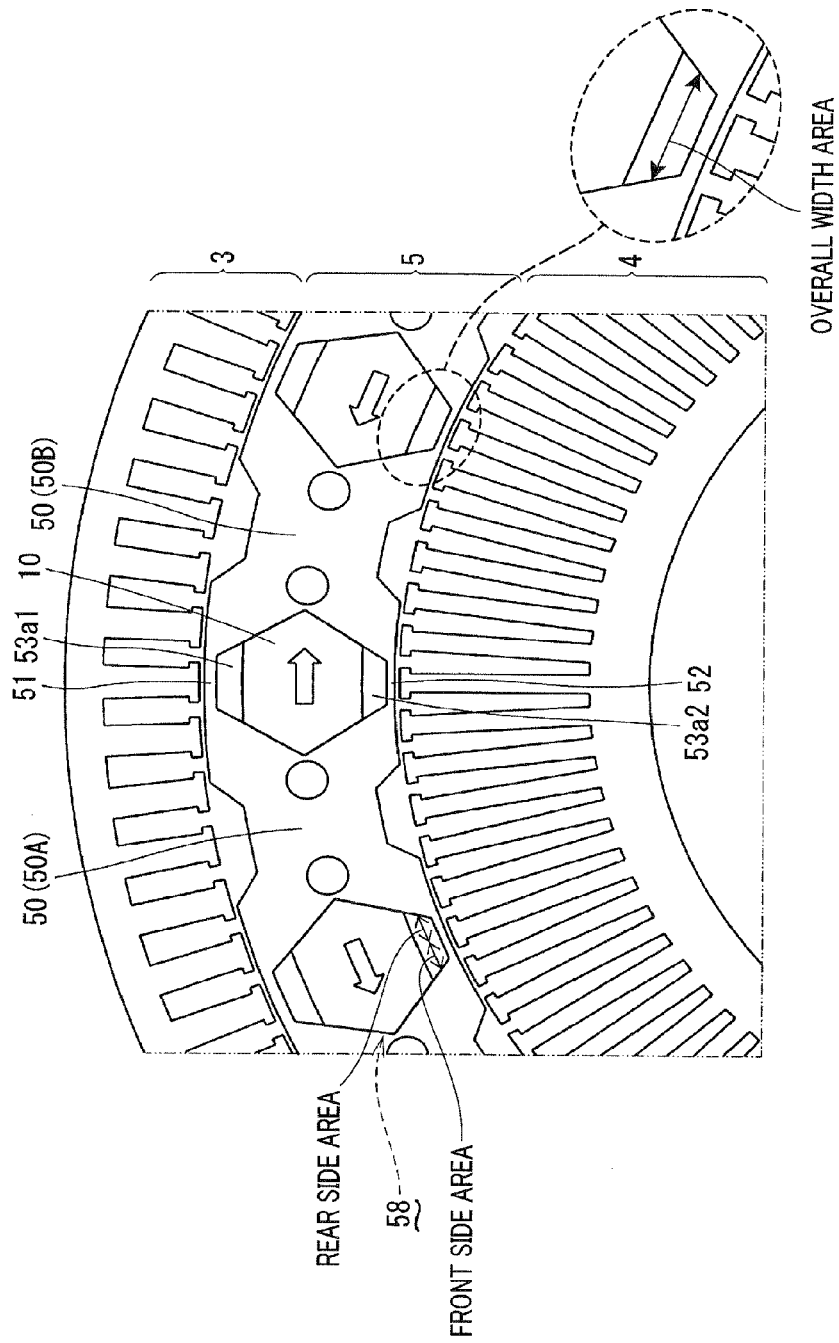
FIG. 6 is a view showing a partial cross section of a double stator synchronous motor according to a second exemplary embodiment of the present invention.

FIG. 6 is a view showing a partial cross section of the double stator synchronous motor according to the second exemplary embodiment of the present invention.

As shown in FIG. 6, an outer aperture section 53a1 is formed in an overall width area (which is composed of a front side area and a rear side area) between the adjacent segment magnetic poles 50 along a rotation direction of the rotor 5. That is, the outer aperture section 53a1 is formed in an overall width area between the adjacent segment magnetic poles 50, namely, between one segment magnetic pole 50A and the other segment magnetic pole 50B, and also between the magnetic-pole outside bridge 51 (at the upper side) and the buried magnet 10.

Similar to the outer aperture section 53a1, an inner aperture section 53a2 is formed in an overall width area (which is composed of a front side area and a rear side area) between the adjacent segment magnetic poles 50 along a rotation direction of the rotor 5. That is, the inner aperture section 53a2 is formed in an overall width area between the adjacent segment magnetic poles 50, namely, between one segment magnetic pole 50A and the other segment magnetic pole 50B, and also between the buried magnet 10 and the magnetic-pole inside bridge 52 (at the lower side).

When the rotor 5 rotates in one direction only or when the magnitude of maximum current is limited to rotate the rotor 5 only in a reverse direction even if the motor 5 is configured to rotate in both directions (in a forward direction and a reverse direction), it is possible to eliminate the occurrence of demagnetization by the aperture section which is formed in one side only (for example, formed at a rear side only in a rotation direction of the rotor 5 in the first exemplary embodiment).

However, there are actual cases in which a motor rotates in both directions, a forward direction (a counterclockwise direction) and a backward direction (a clockwise direction) by using a full limited current or a regenerative operation is executed to generate electric power by using a full limited current. In the actual cases, the buried magnet 10 is separated from the magnetic-pole outside bridge 51 and the magnetic-pole inside bridge 52. That is, each of the aperture sections 53a1 and 53a2 is formed in the overall wide of the area, in which the buried magnet 10 is arranged, between the adjacent segment magnetic poles 50. This structure makes it possible to prevent demagnetization of the buried magnet 10 which is disposed, namely, buried between the adjacent segment magnetic poles 50.

Third Exemplary Embodiment

A description will be given of the double stator synchronous motor according to a third exemplary embodiment with reference to FIG. 7.

Figure 7:
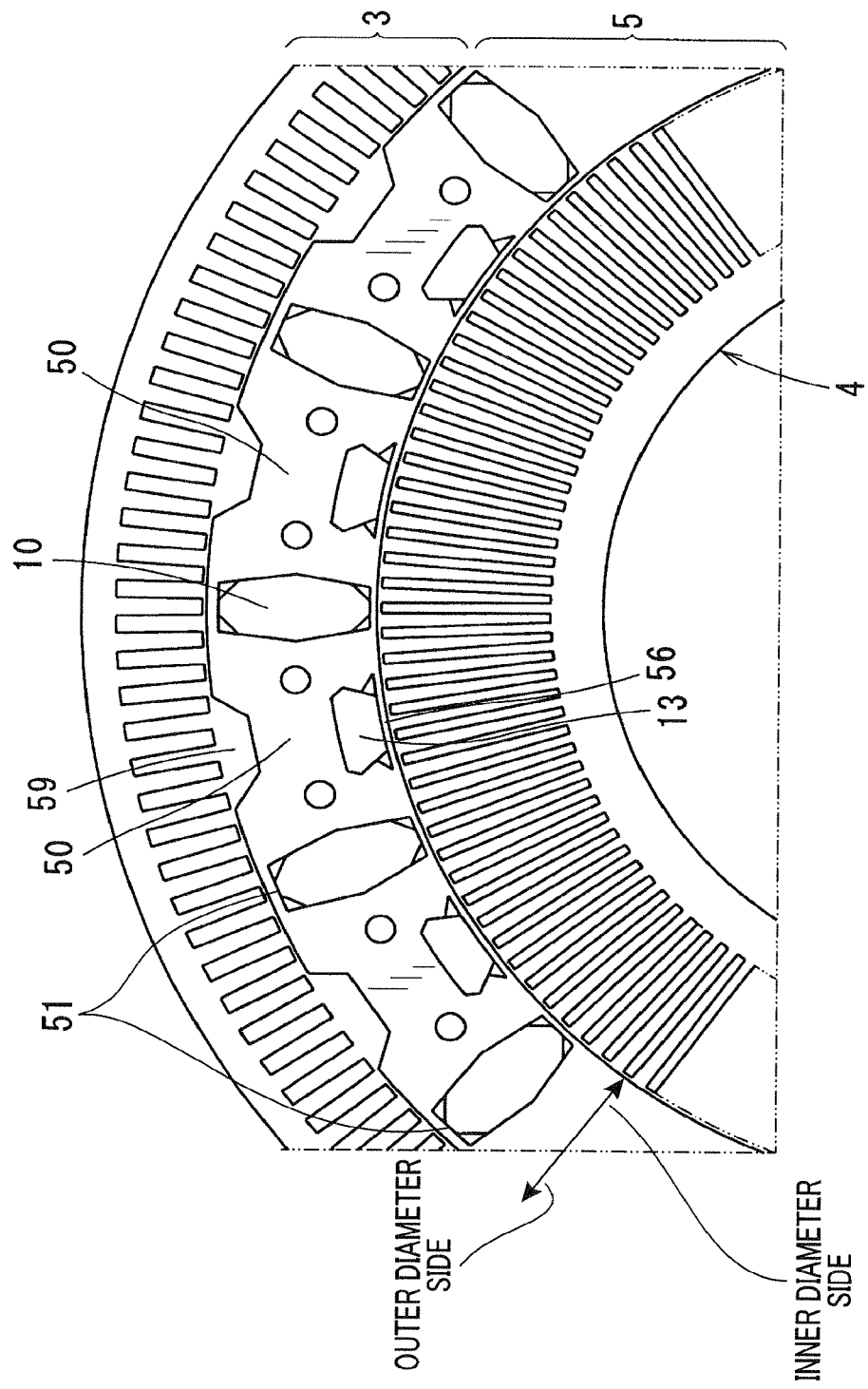
FIG. 7 is a view showing a partial cross section of a double stator synchronous motor according to a third exemplary embodiment of the present invention.

FIG. 7 is a view showing a partial cross section of the double stator synchronous motor according to the third exemplary embodiment of the present invention.

As shown in FIG. 7, the magnetic-pole central magnet 13 is arranged in the inner diameter side of the segment magnetic pole 50.

The outer magnetic concave section (or an outer magnetic depressed section) is formed on an outer diameter side of the segment magnetic pole 50. The outer magnetic concave section is formed as a concave area 59 from the outermost diameter side toward an inner diameter side. The structure using the concave section 59 makes it possible to concentrate the magnetic-pole central magnet 13, as compared with the structure having both the magnetic-pole central magnet 13 formed at the radially inner side and the magnetic-pole central magnet 12 arranged at the radially outer side. It is thereby possible to increase the thickness of the magnetic-pole central magnet 13 in a radial direction of the rotor 5 when the segment magnetic pole 50 has the minimum width Wr in a radial direction. This makes it possible to prevent the magnetic-pole central magnet 13 from being demagnetized, and possible to arrange the magnetic-pole central magnet 13 only in the inner radial side of the segment magnetic pole 50, and possible to increase the driving force of the inner stator 4 having a small diameter.

Further, it is possible for the magnetic-pole inside bridge 56 to have a small bridge thickness in order to have the centrifugal force resistance when the magnetic-pole central magnet 13 is only arranged in the inner radial side of the segment magnetic pole 50, as compared with a structure in which the magnetic-pole central magnet 12 is arranged at the outer diameter side of the segment magnetic pole 50 in addition to arrange the magnetic-pole central magnet 13. Further, this structure makes it possible to have an additional effect to decrease the loss of the magnetic flux through the magnetic-pole inside bridge 56.

Still further, the outer stator 3 can generate a large magnetomotive force and has a large reluctance torque because the outer stator 3 has a large cross section of a magnetic circuit thereof. However, because the outer stator 3 has no magnet to prevent a flow of magnetic flux of q-axis component, it is possible for the outer stator 3 to increase a reluctance torque at the outer side of the outer stator 3. It is therefore possible to increase or enhance the magnetic torque at the inner diameter side and to increase the reluctance torque at the outer diameter side, it is possible to effectively increase the overall torque of the double stator synchronous motor.

Fourth Exemplary Embodiment

A description will be given of the double stator synchronous motor according to a fourth exemplary embodiment with reference to FIG. 8.

The double stator synchronous motor according to the first exemplary embodiment previously described uses the magnetic-pole central magnet 12 and the magnetic-pole central magnet 13 made of ferrite magnets.

On the other hand, the double stator synchronous motor according to the fourth exemplary embodiment uses the magnetic-pole central magnet 12 and the magnetic-pole central magnet 13 made of neodymium magnet instead of ferrite magnet. Further, the double stator synchronous motor according to the fourth exemplary embodiment does not use any buried magnet 10 to be disposed in the magnetic-pole opening section 58 formed between the adjacent segment magnetic poles 50A and 50B.

Figure 8:
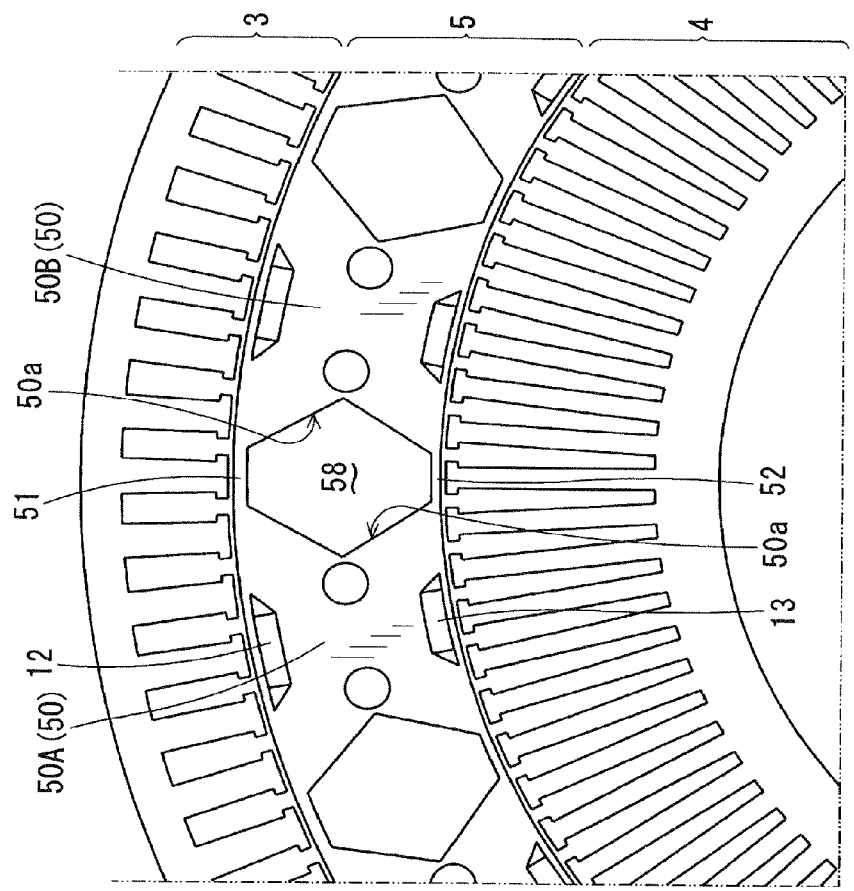
FIG. 8 is a view showing a partial cross section of a double stator synchronous motor according to a fourth exemplary embodiment of the present invention.

FIG. 8 is a view showing a partial cross section of the double stator synchronous motor according to the fourth exemplary embodiment of the present invention.

As shown in FIG. 8, the double stator synchronous motor according to the fourth exemplary embodiment does not have any buried magnet 10 which is arranged in the magnetic-pole opening section 58. The magnetic-pole opening section 58 is formed between the magnetic-pole outside bridge 51 and the magnetic-pole inside bridge 52 and formed between one segment magnetic pole 50A and the other segment magnetic pole 50B which are adjacent to each other.

Because such neodymium magnet has a large magnetic action even if it has a small size and a small thickness, it is possible to eliminate the buried magnet 10 from the rotor 5 when the magnetic-pole central magnet 12 and the magnetic-pole central magnet 13 are made of neodymium magnet. This makes it possible to eliminate the buried magnets 10 having a large size and a large weight, and to increase the durability to withstand centrifugal force generated during the rotation of the rotor 5.

Similar to the structure of the magnetic-pole opening section 58 in the first exemplary embodiment shown in FIG. 1, the magnetic-pole opening section 58 shown in FIG. 8 has a structure in which an opening width of the magnetic-pole opening section 58 is gradually increased from the edge section of the magnetic-pole opening section 58 in a radial direction toward the middle section of the magnetic-pole opening section 58. In each of the magnetic-pole facing surface 50a of one segment magnetic pole 50A and the magnetic-pole facing surface 50a of the other segment magnetic pole 50B, toward the middle section from both the edge sections of the magnetic-pole opening section 58, which are connected to the magnetic-pole outside bridge 51 and the magnetic-pole inside bridge 52, respectively, a circumferential length of the segment magnetic pole 50 is gradually shortened to have a tapered shape. However, because no buried magnet 10 is arranged in the magnetic-pole opening section 58 formed between the adjacent segment magnetic poles 50A and 50B in the rotor 5, it is not necessary to stop the movement of the buried magnet 10 toward a diameter direction and a circumferential direction of the rotor 5. Accordingly, it is possible to change the shape of the magnetic-pole opening section 58 in the double stator synchronous motor according to the fourth exemplary embodiment. In other words, in the structure of the double stator synchronous motor according to the fourth exemplary embodiment, it is not necessary for the magnetic-pole facing surface 50a of one segment magnetic pole 50A and the magnetic-pole facing surface 50a of the other segment magnetic pole 50B to have any tapered shape.

Fifth Exemplary Embodiment

A description will be given of the double stator synchronous motor according to a fifth exemplary embodiment with reference to FIG. 9.

Figure 9:
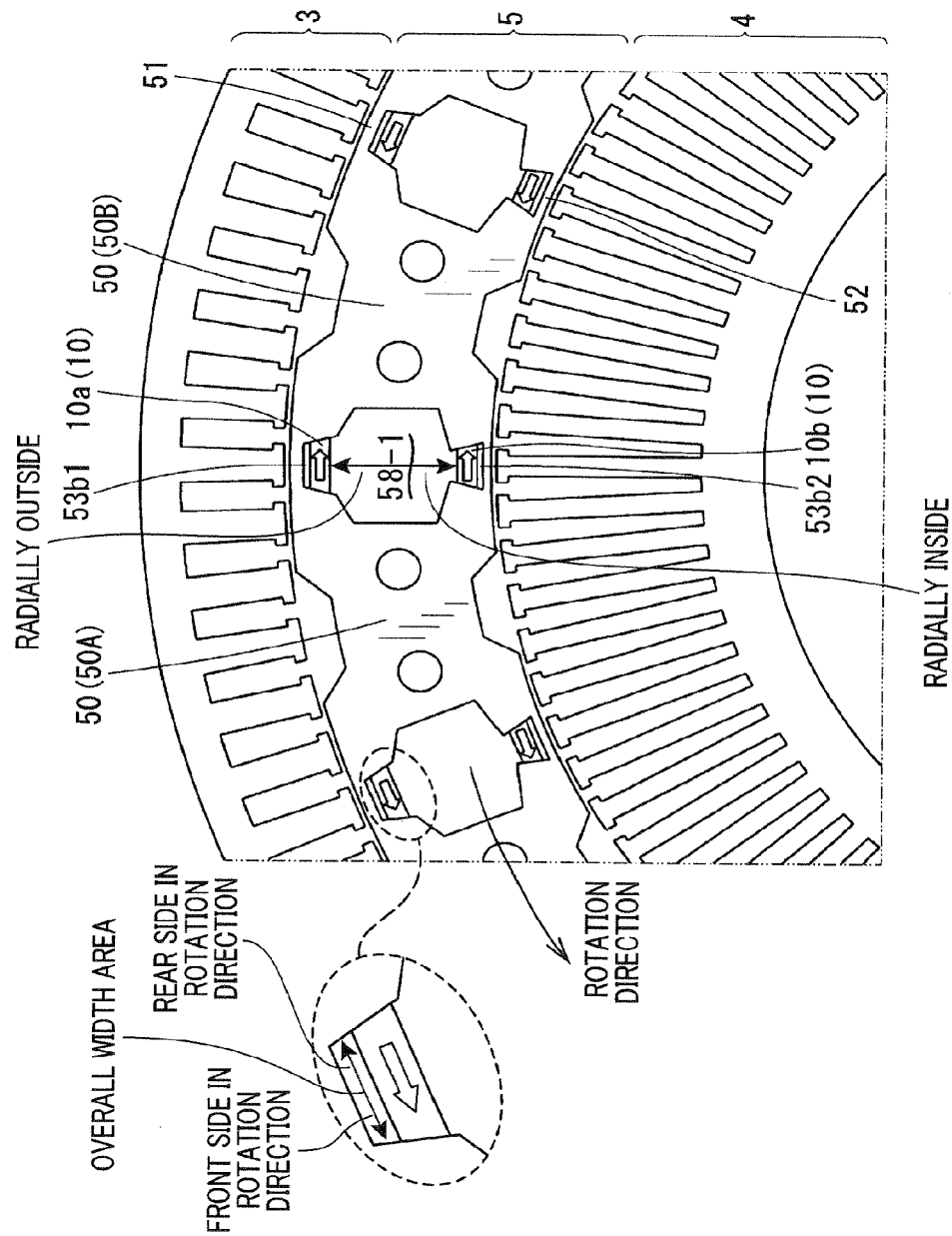
FIG. 9 is a view showing a partial cross section of a double stator synchronous motor according to a fifth exemplary embodiment of the present invention.

FIG. 9 is a view showing a partial cross section of a double stator synchronous motor according to the fifth exemplary embodiment of the present invention. As shown in FIG. 9, the double stator synchronous motor according to the fifth exemplary embodiment has a structure in which each buried magnet 10 is made of neodymium magnet, and each buried magnet 10 is composed of an outer buried magnet 10a and an inner buried magnet 10b. The outer buried magnet 10a is arranged at a radial outside of a magnetic-pole opening section 58-1. The inner buried magnet 10b is arranged at a radially inside of the magnetic-pole opening section 58-1. As shown in FIG. 9, the outer buried magnet 10a is separated from the inner buried magnet 10b. The magnetic-pole opening section 58-1 is formed between the magnetic-pole outside bridge 51 and the magnetic-pole inside bridge 52, and further formed between one segment magnetic pole 50A and the other segment magnetic pole 50B which are adjacent to each other.

An outer aperture section 53b1 is formed at least a rear side of an overall width area in a rotation direction of the rotor 5 and an inner aperture section 53b2 is formed at least a rear side of an overall width area in a rotation direction of the rotor 5.

In the structure shown in FIG. 9, the outer aperture section 53b1 is formed in the overall width area between the magnetic-pole outside bridge 51 and the outer buried magnet 10a and between the adjacent segment magnetic poles 50A and 50B. The overall width area of the outer aperture section 53b1 is composed of the front side and the rear side.

Further, the inner aperture section 53b2 is formed in the overall width area between the magnetic-pole inside bridge 52 and the inner buried magnet 10b, and between the adjacent segment magnetic poles 50A and 50B. The overall width area of the inner aperture section 53b2 is composed of the front side and the rear side.

That is, each of the outer aperture section 53b1 and the inner aperture section 53b2 is formed in the overall width area of the aperture section, in which the buried magnet 10 is disposed, between the adjacent segment magnetic poles 50, namely between one segment magnetic pole 50A and the other segment magnetic pole 50B.

Because neodymium magnets have a large demagnetization resistance, it is possible to arrange such neodymium magnet to an area having the maximum-strongly opposing magnetic field. Because the area having the maximum-strongly opposing magnetic field can shield the d-axis magnetic flux as the d-axis inductance, it is possible to have a large difference between the q-axis inductance and the d-axis inductance. This makes it possible to improve the reluctance torque, and to effectively decrease the amount of neodymium magnet used in the double stator synchronous motor according to the fifth exemplary embodiment.

Further, because there is a space between the outer buried magnet 10a and the inner buried magnet 10b, namely, at the middle section of the magnetic-pole opening section 58-1, it is possible to arrange non-magnetic member (for example, a bolt) in the space formed at the middle section of the magnetic-pole opening section 58-1 in order to support and fix the rotor 5. As a result, it is possible for the double stator synchronous motor according to the fifth exemplary embodiment to withstand at high speed rotation of the rotor 5, and to decrease the use amount of neodymium magnet.

Sixth Exemplary Embodiment

A description will be given of the double stator synchronous motor according to a sixth exemplary embodiment with reference to FIG. 10.

FIG. 10 is a view showing a partial cross section of the double stator synchronous motor according to the sixth exemplary embodiment of the present invention.

In the double stator synchronous motor according to the sixth exemplary embodiment as shown in FIG. 10, a magnetic-pole opening area 58-2 has a circular shape, and is formed between one segment magnetic pole 50A and the other segment magnetic pole 50B. Further, a magnetic member 14 is arranged in the magnetic-pole opening area 58-2 so that the magnetic member 14 is separated from the edge of the one segment magnetic pole 50A and the edge of the other segment magnetic pole 50B. That is, the magnetic member 14 is arranged between the buried magnets 10 arranged in the magnetic-pole opening area 58-2. The magnetic member 14 is separated from one segment magnetic pole 50A through one buried magnet 10 and also separated from the other segment magnetic pole 50B through the other buried magnet 10.

The magnetic member 14 is entered into a magnetically neutral state, namely, becomes a magnetically-neutral member when the magnetic member 14 is arranged in the magnetic-pole opening section 58. This structure and feature will be explained later. The magnetic-pole opening section 58 is formed between one segment magnetic pole 50A and the other segment magnetic pole 50B. One segment magnetic pole 50A and the other segment magnetic pole 50B are adjacent to each other. This feature will be explained later.

That is, as shown in FIG. 10, each magnetic member 14 is arranged along a circumferential direction of the rotor 5 between one segment magnetic pole 50A and the other segment magnetic pole 50B. For example, the magnetic member 14 is a bolt which can support and fix the rotor 5. In particular, one buried magnet 10 is arranged between the magnetic member 14 and one segment magnetic pole 50A. Similarly, the other buried magnet 10 is arranged between the magnetic member 14 and the other segment magnetic pole 50B. That is, the magnetic member 14 is separated in position from the edge of one segment magnetic pole 50A and also separated in position from the edge of the other segment magnetic pole 50B.

Each buried magnet 10 is made of rare earth magnet such as neodymium magnet. Each buried magnet 10 is magnetized in a direction designated by white outline arrows shown in FIG. 10.

As shown in FIG. 10, an outer aperture section 53c1 is formed between the adjacent segment magnetic poles 50, namely, between one segment magnetic pole 50A and the other segment magnetic pole 50B, and also between the magnetic-pole outside bridge 51 (at the upper side) and the magnetic member 14.

Similar to the outer aperture section 53c1, an inner aperture section 53c2 is formed between the adjacent segment magnetic poles 50, namely, between one segment magnetic pole 50A and the other segment magnetic pole 50B, and also between the magnetic member 14 and the magnetic-pole inside bridge 52 (at the lower side).

In the structure shown in FIG. 10, the outer aperture section 53c1 is formed in an overall width area (which is composed of a front side area and a rear side area) between the adjacent buried magnets 10 along a rotation direction of the rotor 5, and the inner aperture section 53c2 is formed in an overall width area (which is composed of a front side area and a rear side area) between the adjacent buried magnets 10 along a rotation direction of the rotor 5. It is possible to form each of the outer aperture section 53c1 and the inner aperture section 53c2 in at least one of a front side area and a rear side area.

Because neodymium magnet used as the buried magnet 10 has a large demagnetization resistance and is difficult to be demagnetized even if the neodymium magnet has a thin thickness, the magnetic member 14 is arranged, as shown in FIG. 10, in an area which is separated from the peripheral edge of the magnetic-pole opening section 58-2, namely, from the peripheral edge of each of the adjacent segment magnetic poles 50, and the buried magnet 10 made of neodymium magnet is arranged in the magnetic-pole opening section 58-2 between the magnetic member 14 and the peripheral edge of one segment magnetic pole 50A. Further, the buried magnet 10 made of neodymium magnet is also arranged in the magnetic-pole opening section 58-2 between the magnetic member 14 and the peripheral edge of the other segment magnetic pole 50B.

That is, as shown in FIG. 10, the buried magnets 10 made of neodymium magnet are arranged along a circumferential direction of the rotor 5 at both sides of the magnetic member 14 arranged in the magnetic-pole opening section 58-2.

In other words, the magnetic member 14 is arranged between one buried magnet 10 and the other buried magnet 10 which are arranged along a circumferential direction of the rotor 5. This makes it possible to enter the magnetic member 14 into a magnetically neutral state and possible to use the rotor disk 6 made of magnetic material (see FIG. 2) which supports the rotor 5. It is also possible to reduce the total amount of neodymium magnet in the double stator synchronous motor according to the present invention.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A synchronous motor comprising:
a rotor comprising segment magnetic poles made of soft magnetic material arranged in a ring shape in a circumferential direction of the rotor, magnetic concave sections having a magnetic permeability which is lower than a magnetic permeability of the soft magnetic material, and the magnetic concave sections being formed on each of an inner surface and an outer surface of each of the segment magnetic poles;
a stator assembly comprising at least a first stator and a second stator,
the first stator arranged at an outside of the rotor through a gap, the first stator comprising a plurality of slots and a plurality of first tooth sections formed in the first stator at regular intervals, each first tooth section being formed between the adjacent slots, and a first stator winding being wound around the first tooth sections; and
the second stator arranged at an inside of the rotor through a gap, the second stator comprising a plurality of slots and a plurality of second tooth sections formed in a circumferential direction of the second stator at regular intervals, each second tooth section being formed between the adjacent slots, and a second stator winding being wound around the second tooth sections,
wherein each of the first stator and the second stator has magnetic poles the number of which is equal to the number of the segment magnetic poles, and the first stator and the second stator generate magnetomotive force so that the magnetic poles in the first stator and the second stator in face-to face relationship have the same magnetic polarity, and the first stator winding and the second stator winding per phase are connected in series with each other,
a variable q representing the number of the slots per magnetic pole per phase is an integer not less than two, and
a minimum width Wr of the segment magnetic poles is within a range of 1.3q to 2.3q times of a minimum circumferential width Wt of the first tooth sections in the first stator, where the minimum width Wr is a width between the magnetic concave section formed at an outer side of the segment magnetic pole and the magnetic concave section formed at an inner side of the segment magnetic pole, and
a depth of each magnetic concave section is not less than an average circumferential width Ws of the slots formed in the second stator.

2. A synchronous motor comprising:
a rotor comprising segment magnetic poles made of soft magnetic material arranged in a ring shape in a circumferential direction of the rotor, magnetic concave sections having a magnetic permeability which is lower than a magnetic permeability of the soft magnetic material, and the magnetic concave sections being formed on each of an inner surface and an outer surface of each of the segment magnetic poles;
a stator assembly comprising at least an outer stator and an inner stator,
the outer stator arranged at a radial outside of the rotor through a gap, the outer stator comprising a plurality of slots and a plurality of outer tooth sections formed in a circumferential direction of the outer stator at regular intervals, each outer tooth section being formed between the circumferentially adjacent slots, and an outer stator winding being wound around the outer tooth sections; and
the inner stator arranged at a radially inside of the rotor through a gap, the inner stator comprising a plurality of slots and a plurality of inner tooth sections formed in a circumferential direction of the inner stator at regular intervals, each inner tooth section being formed between the circumferentially adjacent slots, and an inner stator winding being wound around the inner tooth sections,
wherein each of the outer stator and the inner stator has magnetic poles the number of which is equal to the number of the segment magnetic poles, and the outer stator and the inner stator generate magnetomotive force so that the magnetic poles in the outer stator and the inner stator in face-to face relationship in a radial direction have the same magnetic polarity, and the outer stator winding and the inner stator winding per phase are connected in series with each other,
a variable q representing the number of the slots per magnetic pole per phase is an integer not less than two,
a radially minimum width Wr of the segment magnetic poles is within a range of 1.3q to 2.3q times of a minimum circumferential width Wt of the outer tooth sections in the outer stator, where the radially minimum width Wr is a width in a radial direction between the magnetic concave section formed at a radially outer side of the segment magnetic pole and the magnetic concave section formed at a radially inner side of the segment magnetic pole, and
a radial depth of each magnetic concave section is not less than an average circumferential width Ws of the slots formed in the inner stator.

3. The synchronous motor according to claim 2, wherein the adjacent segment magnetic poles which are adjacent to each other in a circumferential direction of the rotor are composed of a first segment magnetic pole and a second segment magnetic pole, the first segment magnetic pole has a magnetic-pole facing section which faces the second segment magnetic pole in a circumferential direction of the rotor, and the second segment magnetic pole has a magnetic-pole facing section which faces the first segment magnetic pole in a circumferential direction of the rotor,
the rotor comprises magnetic-pole outside bridges, magnetic-pole inside bridges, magnetic-pole opening sections and buried magnets made of permanent magnets,
wherein a radially outermost surface of the one segment magnetic pole is connected to a radially outermost surface of the adjacent segment magnetic pole through the magnetic-pole outside bridge, and
a radially innermost surface of one segment magnetic pole is connected to a radially innermost surface of the adjacent segment magnetic pole through the magnetic-pole inside bridge,
the magnetic-pole opening section is formed between the magnetic-pole outside bridge and the magnetic-pole inside bridge and between the first segment magnetic pole and the second segment magnetic pole, and the buried magnet made of permanent magnet is arranged in the magnetic-pole opening section,
a movement limiting section is formed in the magnetic-pole facing sections and the buried magnet, and the movement limiting section prevents the movement of the buried magnet in a radial direction of the rotor, and
aperture sections are formed in at least a rear side in the magnetic-pole opening section in a rotation direction of the rotor between the buried magnet and the magnetic-pole outside bridge, and between the buried magnet and the magnetic-pole inside bridge.

4. The synchronous motor according to claim 2, wherein the rotor has permanent magnets which are arranged in both or at least one of the magnetic concave section formed at a radially outer side of the segment magnetic pole and the magnetic concave section formed at a radially inner side of the segment magnetic pole.

5. The synchronous motor according to claim 3, wherein the rotor comprises at least one of a magnetic-pole outside bridge and a magnetic-pole inside bridge,
   the magnetic-pole outside bridge is extended in a circumferential direction of the rotor at a radial outside of the magnetic to concave section formed at the radial outside of the segment magnetic pole so that the radially outermost surface of the segment magnetic pole is connected through the magnetic-pole outside bridge,
   the magnetic-pole inside bridge is extended in a circumferential direction of the rotor at a radially inside of the magnetic concave section formed at the radially inside of the segment magnetic pole so that the radially innermost surface of the segment magnetic pole is connected through the magnetic-pole inside bridge,
   when one of the magnetic-pole outside bridge and the magnetic-pole inside bridge is used as a magnetic-pole center bridge, the permanent magnet made of ferrite magnet is arranged in each magnetic concave section, an aperture section is formed at least a rear side of a rotation direction of the rotor between the magnetic-pole center bridge and the permanent magnet made of ferrite magnet.

6. The synchronous motor according to claim 4, wherein the permanent magnet is arranged only in the magnetic concave section formed at a radially inside of the segment magnetic pole, and
   the magnetic concave section formed at a radial outside of the segment magnetic pole is made by a concave section which is depressed toward the inside from a radially outermost section of the segment magnetic pole.

7. The synchronous motor according to claim 3, wherein each buried magnet is made of rare earth magnet and is composed of an outer buried magnet and an inner buried magnet,
   the outer buried magnet and the inner buried magnet are separated from each other so that the outer buried magnet is arranged at a radial outside of the magnetic-pole opening section, and the inner buried magnet is arranged at a radially inside of the magnetic-pole opening section, and
   an aperture section is formed at least a rear side of a rotation direction of the rotor between the magnetic-pole outside bridge and the outer buried magnet, and between the magnetic-pole inside bridge and the inner buried magnet.

8. The synchronous motor according to claim 3 wherein a magnetically-neutral member is arranged in the magnetic-pole opening section at an area which is separated from one segment magnetic pole and also separated from the other segment magnetic pole which are adjacent with each other, and
   one buried magnet made of rare earth magnet is arranged in the magnetic-pole opening section between the magnetically-neutral member and one segment magnetic pole, and the other buried magnet made of rare earth magnet is arranged in the magnetic-pole opening section between the magnetically-neutral member and the other segment magnetic pole,
   an aperture section is formed in at least a circumferentially rear side in a rotation direction of the rotor between the magnetically-neutral member and the magnetic-pole outside bridge, and
   an aperture section is formed in at least a circumferentially rear side in a rotation direction of the rotor between the magnetically-neutral member and the magnetic-pole inside bridge.

* * * * *